United States Patent
Kang et al.

(10) Patent No.: US 10,048,764 B2
(45) Date of Patent: Aug. 14, 2018

(54) SENSOR MODULE AND DEVICE INCLUDING THE SAME

(71) Applicant: Samsung Electronics Co., Ltd., Suwon-si, Gyeonggi-do (KR)

(72) Inventors: Hwa-Yong Kang, Suwon-si (KR); Young-Kwon Yoon, Seoul (KR); Moon-Soo Kim, Seoul (KR); Tae-Ho Kim, Cheongju-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 196 days.

(21) Appl. No.: 14/698,138

(22) Filed: Apr. 28, 2015

(65) Prior Publication Data

US 2015/0324003 A1 Nov. 12, 2015

(30) Foreign Application Priority Data

May 9, 2014 (KR) ........................ 10-2014-0055427

(51) Int. Cl.
| | |
|---|---|
| *G01N 21/00* | (2006.01) |
| *G06F 3/01* | (2006.01) |
| *G01B 11/22* | (2006.01) |
| *G01V 8/10* | (2006.01) |
| *G01J 1/42* | (2006.01) |
| *G06K 9/00* | (2006.01) |
| *H04M 1/02* | (2006.01) |
| *H04W 52/02* | (2009.01) |

(52) U.S. Cl.
CPC .............. *G06F 3/017* (2013.01); *G01B 11/22* (2013.01); *G01J 1/42* (2013.01); *G01V 8/10* (2013.01); *G06K 9/00228* (2013.01); *H04M 1/026* (2013.01); *H04W 52/0254* (2013.01); *H04M 1/0277* (2013.01); *H04M 2250/12* (2013.01); *Y02D 70/00* (2018.01); *Y02D 70/142* (2018.01); *Y02D 70/144* (2018.01); *Y02D 70/164* (2018.01); *Y02D 70/166* (2018.01); *Y02D 70/168* (2018.01); *Y02D 70/26* (2018.01)

(58) Field of Classification Search
CPC ... G06F 3/01; G01B 11/22; G01V 8/10; G01J 1/42; G01J 3/02; G06K 9/00; G01N 21/64; G01N 21/68; H01J 37/32935
See application file for complete search history.

(56) References Cited

U.S. PATENT DOCUMENTS

| | | | |
|---|---|---|---|
| 2006/0125936 | A1 | 6/2006 | Gruhike et al. |
| 2007/0111765 | A1 | 5/2007 | Sato |
| 2008/0165160 | A1 | 7/2008 | Kocienda et al. |
| 2008/0242377 | A1* | 10/2008 | Lee .................. G06F 3/044 455/575.1 |
| 2009/0051793 | A1 | 2/2009 | Smith |
| 2009/0139778 | A1* | 6/2009 | Butler .................. G06F 1/1626 178/18.03 |
| 2010/0073499 | A1 | 3/2010 | Gere |
| 2011/0074931 | A1 | 3/2011 | Bilbrey et al. |

(Continued)

FOREIGN PATENT DOCUMENTS

EP    1 275 933 A2    1/2003

*Primary Examiner* — Abdullahi Nur
(74) *Attorney, Agent, or Firm* — Jefferson IP Law, LLP

(57) ABSTRACT

A sensor module is provided. The sensor module includes three or more sensors and includes a substrate having the three or more sensors arranged thereon.

17 Claims, 14 Drawing Sheets

(56) References Cited

U.S. PATENT DOCUMENTS

| | | |
|---|---|---|
| 2011/0096219 A1* | 4/2011 | Lee .................... H01L 27/14618 |
| | | 348/308 |
| 2011/0128234 A1* | 6/2011 | Lipman ................ G06F 3/0412 |
| | | 345/173 |
| 2011/0205407 A1 | 8/2011 | Olsen et al. |
| 2011/0264928 A1 | 10/2011 | Hinckley |
| 2011/0306304 A1 | 12/2011 | Forutanpour et al. |
| 2012/0044328 A1 | 2/2012 | Gere |
| 2012/0132806 A1* | 5/2012 | Findlay ................ G01J 1/0266 |
| | | 250/338.1 |
| 2012/0154633 A1 | 6/2012 | Rodriguez |
| 2012/0281206 A1 | 11/2012 | Ko et al. |
| 2013/0019459 A1* | 1/2013 | Lim .................... H03K 17/941 |
| | | 29/592.1 |
| 2013/0140666 A1* | 6/2013 | Fu .................... H01L 21/76237 |
| | | 257/446 |
| 2013/0201102 A1 | 8/2013 | Klinghult |
| 2015/0029019 A1* | 1/2015 | Matsuoka ............ G08B 25/001 |
| | | 340/501 |
| 2015/0190094 A1* | 7/2015 | Lee ...................... A61B 5/6898 |
| | | 600/479 |

\* cited by examiner

SENSOR MODULE AND DEVICE INCLUDING THE SAME

CROSS-REFERENCE TO RELATED APPLICATION(S)

This application claims the benefit under 35 U.S.C. § 119(a) of a Korean patent application filed on May 9, 2014 in the Korean Intellectual Property Office and assigned Serial number 10-2014-0055427, the entire disclosure of which is hereby incorporated by reference.

TECHNICAL FIELD

The present disclosure relates to a sensor module. More particularly, the present disclosure relates to an arrangement of a plurality of sensors mounted on a mobile device.

BACKGROUND

A mobile device, for example, may be an electronic communication device that allows a user to enjoy multimedia services such as storing various pieces of information, gaming, watching videos, as well as communication functions such as voice calls or transmission of messages while being carried. Furthermore, for example, portable mobile devices include a mobile communication phone, a palm-sized Personal Computer (PC), a Personal Digital Assistant (PDA), a hand-held PC, a smartphone, a wireless Local Area Network (LAN) terminal, a laptop computer, a netbook, and a tablet PC.

Recently, financial business information, such as a payment of a small sum of currency, game/multimedia services, and communication functions such as voice calls, have been utilized by mobile devices. Initially, although mobile devices only provided voice calls or simple message services, the functions of the services have been expanded to security functions that secure financial business transactions, multimedia functions by which games/videos can be enjoyed, and simple official business functions including the transmission and reception of mail, as well as communication functions. While these functions have increased, the mobile devices have become smaller and slimmer due to the development of electronic/communication technologies.

For example, a touchscreen, a receiver, and a plurality of sensors are disposed on a front surface of such mobile devices, where these sensors include an ambient light sensor, a proximity sensor, and an image sensor for a camera function.

However, according to the related art, one sensor is generally mounted in one module to be modulated such that modules are mounted on a substrate in order to implement their functions, and the modulated sensors are mounted to suitable sites of the mobile device. For example, a plurality of sensors are arranged in an area of an upper end of a front surface of a mobile device according to the related art. A plurality of sensors are arranged in parallel on opposite sides of a speaker/receiver of the mobile device according to the related art.

In addition, because the mobile device is capable of high performance, a larger number of sensors should be included.

As a result, several sensor modules are necessary to implement various functions, but there is a limit in mounting spaces of the mobile device, and it is spatially inconvenient to interconnect the sensors.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a sensor module that can perform a plurality of functions based on signals received from a plurality of sensors and allow a sensor to detect information detected by another sensor in another method, thereby increasing accuracy.

Another aspect of the present disclosure is to provide a sensor module in which three or more sensors are arranged in one substrate so that a mounting spatial efficiency of the sensor module can be increased.

Another aspect of the present disclosure is to provide a sensor module in which a plurality of sensors are arranged along a digital block provided in a substrate, and the sensors are interconnected with the digital block.

In accordance with an aspect of the present disclosure, a sensor module is provided. The sensor module includes three or more sensors, and a substrate having the three or more sensor arranged thereon.

In accordance with another aspect of the present disclosure, a mobile device is provided. The mobile device includes a front surface area including a substrate, and three or more sensors arranged on the substrate, wherein each of the three or more sensors is spaced apart from one another, and wherein the three or more sensors are mounted to the front surface area.

In accordance with another aspect of the present disclosure, a method of driving sensors of a sensor module manufactured by arranging first to fourth sensors on a substrate is provided. The method includes recognizing, by the sensor module, a face/gesture of a user, and driving, by the sensor module, only the first sensor of the first to fourth sensors, when the face/gesture of the user is recognized, such that the second sensor, the third sensor and the fourth sensor are in a sleep mode.

According to the present disclosure, a component space utility of a mobile device can be increased by arranging four sensors that share a digital block on one substrate.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
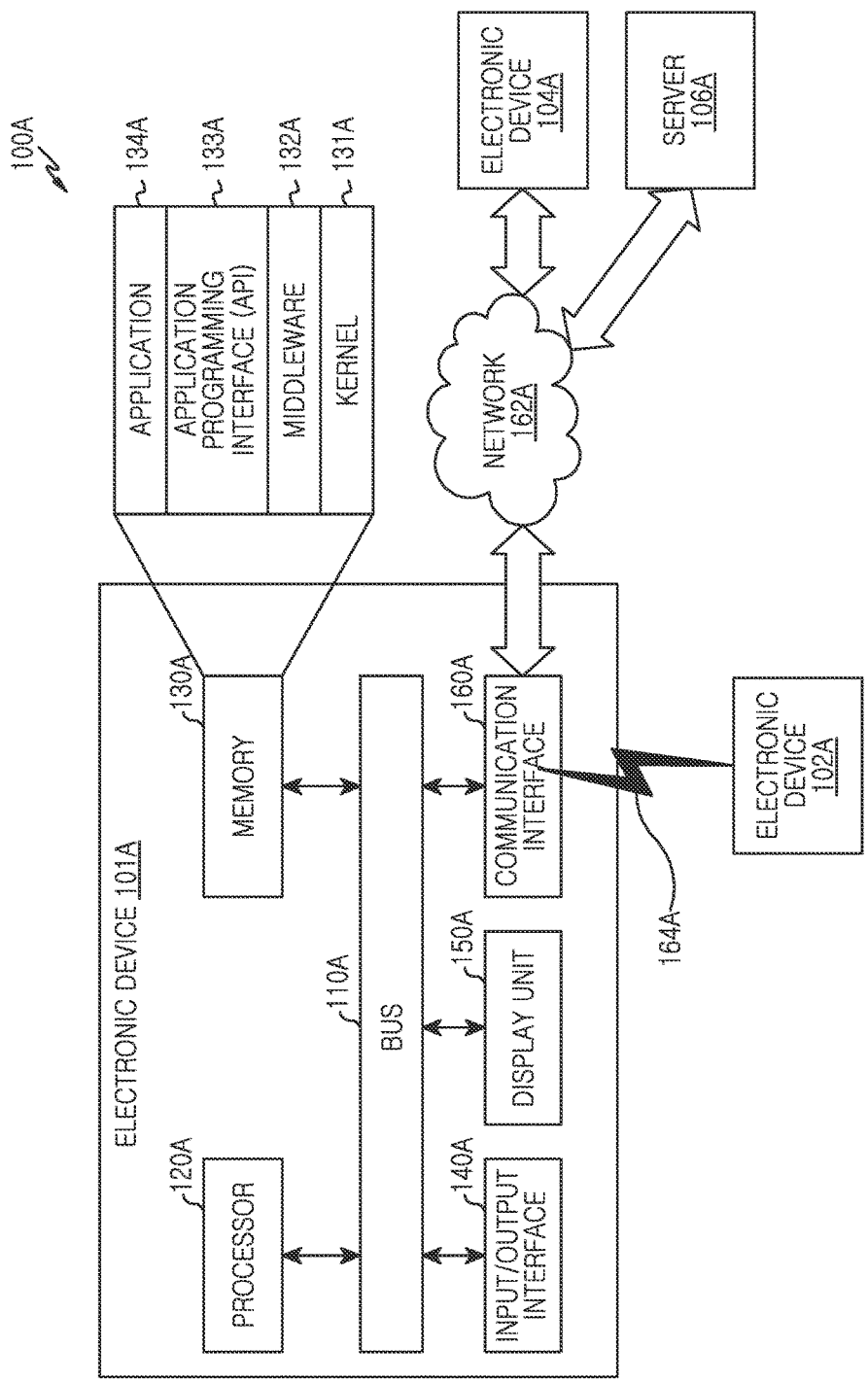
FIG. 1 is a diagram illustrating a network environment including an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following descriptions of the various embodiments of the present disclosure, the term "substantially" is used to mean that a referred characteristic, parameter or value need not be correctly achieved and a tolerance, a measurement error, a deviation or variation including an error in measurement accuracy and other factors known to a person skilled in the art may occur to an extent that does not exclude an effect intended to provide by related features.

In the present disclosure, the expressions "include" and/or "may include" refer to existence of a corresponding function, operation, or element, and do not limit one or more additional functions, operations, or elements. Also, as used herein, the terms "include" and/or "have" should be construed to denote a certain feature, number, operation, element, component or a combination thereof, and should not be construed to exclude the existence or possible addition of one or more other features, numbers, operations, elements, components, or combinations thereof.

In the present disclosure, the expression "or" includes any or all combinations of words enumerated together. For example, the expression "A or B" may include A, may include B, or may include both A and B.

Although the expressions such as "first" and "second" in the present disclosure can modify various constituent elements of the present disclosure, they do not limit the constituent elements. For example, the above expressions do not limit the sequence and/or importance of the corresponding elements. The above expressions may be used merely for the purpose of distinguishing one element from the other elements. For example, a first user device and a second user device indicate different user devices although both of them are user devices. For example, a first element may be termed a second element, and similarly, a second element may be termed a first element without departing from the scope of the present disclosure.

When an element is referred to as being "coupled" or "connected" to any other element, it should be understood that not only the element may be directly coupled or connected to the other element, but also a third element may be interposed therebetween. Contrarily, when an element is referred to as being "directly coupled" or "directly connected" to any other element, it should be understood that no element is interposed therebetween.

The terms used in the present disclosure are only used to describe specific embodiments, and are not intended to limit the present disclosure. As used herein, the singular forms are intended to include the plural forms as well, unless the context clearly indicates otherwise.

Unless defined otherwise, all terms used herein, including technical and scientific terms, have the same meaning as those commonly understood by a person of ordinary skill in the art to which the present disclosure pertains. Such terms as those defined in a generally used dictionary are to be interpreted to have the meaning equal to the contextual meaning in the relevant field of art, and are not to be interpreted to have ideal or excessively formal meaning unless clearly defined in the present disclosure.

An electronic device according to the present disclosure may be a device including a communication function. For example, the electronic device may include at least one of a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical device, a camera, and a wearable device (for example, a Head-Mounted-Device (HMD) such as electronic glasses, electronic clothes, an electronic bracelet, an electronic necklace, an electronic accessory, an electronic tattoo, and a smart watch).

According to an embodiment, an electronic device may be a smart home appliance with a communication function. The smart home appliance as an example of the electronic device may include at least one of, for example, a television (TV), a Digital Versatile Disc (DVD) player, an audio system, a refrigerator, an air conditioner, a vacuum cleaner, an oven, a microwave oven, a washing machine, an air cleaner, a set-top box, a TV box (e.g., Samsung HomeSync™, Apple TV™, and/or Google TV™), a game console, an electronic dictionary, an electronic key, a camcorder, and an electronic picture frame.

According to various embodiments, the electronic device may include at least one of various types of medical devices (for example, Magnetic Resonance Angiography (MRA), Magnetic Resonance Imaging (MRI), Computed Tomography (CT), a scanning machine, ultrasonic wave device and the like), a navigation device, a Global Positioning System (GPS) receiver, an Event Data Recorder (EDR), a Flight Data Recorder (FDR), a car infotainment device, ship electronic equipment (for example, navigation equipment for a ship, a gyro compass and the like), avionics, a security device, and an industrial or home robot.

According to various embodiments, the electronic device may include at least one of furniture or a part of a building/structure, an electronic board, an electronic signature receiving device, a projector, and various types of measuring devices (for example, a water meter, an electric meter, a gas meter, a radio wave meter and the like) including a camera function. The electronic device according to the present disclosure may be a combination of one or more of the aforementioned various devices. Further, it is obvious to those skilled in the art that the electronic device according to the present disclosure is not limited to the aforementioned devices.

Hereinafter, an electronic device according to various embodiments of the present disclosure will be described with reference to the accompanying drawings. In various embodiments, the term "user" may indicate a person using an electronic device or a device (e.g. an artificial intelligence electronic device) using an electronic device.

FIGS. 1 through 13, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element.

FIG. 1 is a diagram illustrating a network environment including an electronic device according to an embodiment of the present disclosure.

Referring to FIG. 1, a network environment 100A is illustrated, where the network environment 100A may include an electronic device 101A, which may include a bus 110A, a processor 120A, a memory 130A, an input/output interface 140A, a display unit 150A, and a communication interface 160A.

The bus 110A may be a circuit that interconnects the above-described elements and delivers communication signals (for example, a control message) between the above-described elements.

The processor 120A may receive a command from the above-described other elements (for example, the memory 130A, the input/output interface 140A, the display unit 150A, and the communication interface 160A), for example, through the bus 110A, decode the received command, and perform calculation or data processing according to the decoded command.

The memory 130A may store the command or data received from the processor 120A and/or the other elements (for example, the input/output interface 140A, the display unit 150A, and the communication interface 160A) and/or generated by the processor 120A and/or the other elements. The memory 130A may include programming modules, for example, a kernel 131A, middleware 132A, an Application Programming Interface (API) 133A, and/or an application 134A. Each of the aforementioned programming modules may include software, firmware, hardware, or a combination of two or more thereof.

The kernel 131A may control or manage system resources (for example, the bus 110A, the processor 120A, and the memory 130) used to perform operations or functions implemented in the remaining programming modules, for example, the middleware 132A, the API 133A, and the applications 134A. The kernel 131A may provide an interface through which the middleware 132A, the API 133A, and the application 134A may access individual elements of the electronic device 101A to control or manage them.

The middleware 132A may serve as an intermediary, such that the API 133A and/or the application 134A may communicate with the kernel 131A to transmit and receive data. In relation to requests for operation received from the applications 134A, the middleware 132A may control (for example, perform scheduling and/or load-balancing) the requests by using, for example, a method of allocating priorities for using system resources (for example, the bus 110A, the processor 120A, and/or the memory 130A) of the electronic device 101A to one or more applications of the applications 134A.

The API 133A is an interface by which the application 134A controls functions provided from the kernel 131A and/or the middleware 132A, and may include, for example, at least one interface or function (for example, an instruction) for file control, window control, image processing, or text control.

According to various embodiments of the present disclosure, the application 134A may include a Short Message Service (SMS)/Multimedia Message Service (MMS) application, an e-mail application, a calendar application, an alarm application, a health care application (for example, an application for measuring a work rate and/or a blood sugar), and an environment information application (for example, an application for providing atmospheric pressure, humidity, and/or temperature information). Additionally or alternatively, the application 134A may include an application related to information exchange between the electronic device 101A and an external electronic device (for example, an electronic device 102A and/or an electronic device 104A). The application related to the information exchange may include, for example, a notification relay application for transferring particular information to the external electronic device or a device management application for managing the external electronic device.

For example, the notification relay application may include a function of transferring notification information generated in other applications (for example, the SMS/MMS application, the e-mail application, the health care application, and/or the environmental information application) of the electronic device 101A to external electronic devices (for example, the electronic device 102A or the electronic device 104A). Additionally or alternatively, the notification relay application may receive notification information from, for example, external electronic devices (for example, the electronic device 102A and/or the electronic device 104A) and provide the same to a user.

The device management application may manage (for example, install, delete, and/or update), for example, at least some functions (for example, turning external electronic device (or some elements) on or off, and/or adjusting the brightness (or resolution) of a display) of an external electronic device (for example, the electronic device 102A and/or the electronic device 104A) that communicates with the electronic device 101A, applications performed in the external electronic device, and/or services (for example, a phone call service, and/or a messaging service) provided in the external electronic device.

According to various embodiments, the application 134A may include applications, which are designated according to an attribute (for example, a type of electronic device) of the external electronic device (for example, the electronic device 102A and/or the electronic device 104A). For example, when the external electronic device is an MP3 player, the application 134A may include an application related to the reproduction of music. Similarly, when the external electronic device is a mobile medical device, the application 134A may include an application related to health care. According to an embodiment of the present disclosure, the application 134A may include at least one of applications designated in the electronic device 101A and/or applications received from an external electronic device (for example, a server 106A and/or the electronic devices 102A and/or 104A).

The input/output interface 140A may deliver a command or data input from the user through a sensor (for example, an acceleration sensor and/or a gyro sensor) and/or an input unit (for example, a keyboard and/or a touchscreen) to the processor 120A, the memory 130A, and the communication interface 160A, for example, through the bus 110A. For example, the input/output interface 140A may provide data for a user's touch, which is input through the touchscreen, to the processor 120A. The input/output interface 140A may output a command or data received from the processor 120A, the memory 130A, and/or the communication interface 160A, for example, through the bus 110, through the output unit (for example, a speaker and/or a display). For example, the input/output interface 140A may output voice data processed through the processor 120A to the user through a speaker.

The display unit 150A may display various pieces of information (for example, multimedia data and/or text data) to the user.

The communication interface 160A may connect communication between the electronic device 101A and the external electronic device (for example, the electronic device 102A, the electronic device 104A, and/or the server 106A). For example, the communication interface 160A may support a network communication 162A (for example, the Internet, a Local Area Network (LAN), a Wide Area Network (WAN), a telecommunication network, a cellular network, a satellite network, and/or Plain Old Telephone Service (POTS), a short-range communication 164A (for example, Wireless Fidelity (WiFi), Bluetooth (BT), a Near Field Communication (NFC)), and/or a wired communication (for example, a Universal Serial Bus (USB), a High Definition Multimedia Interface (HDMI), Recommended Standard 232 (RS-232), and/or a POTS).

According to an embodiment of the present disclosure, a protocol (for example, a short-range communication protocol, a network communication protocol, and/or a wired communication protocol) for communication between the electronic device 101A and an external device may supported by at least one of the API 133A and the middleware 132A. The electronic devices 102A and 104A may be of the same type as, or different from, the electronic device 101A.

Figure 2:
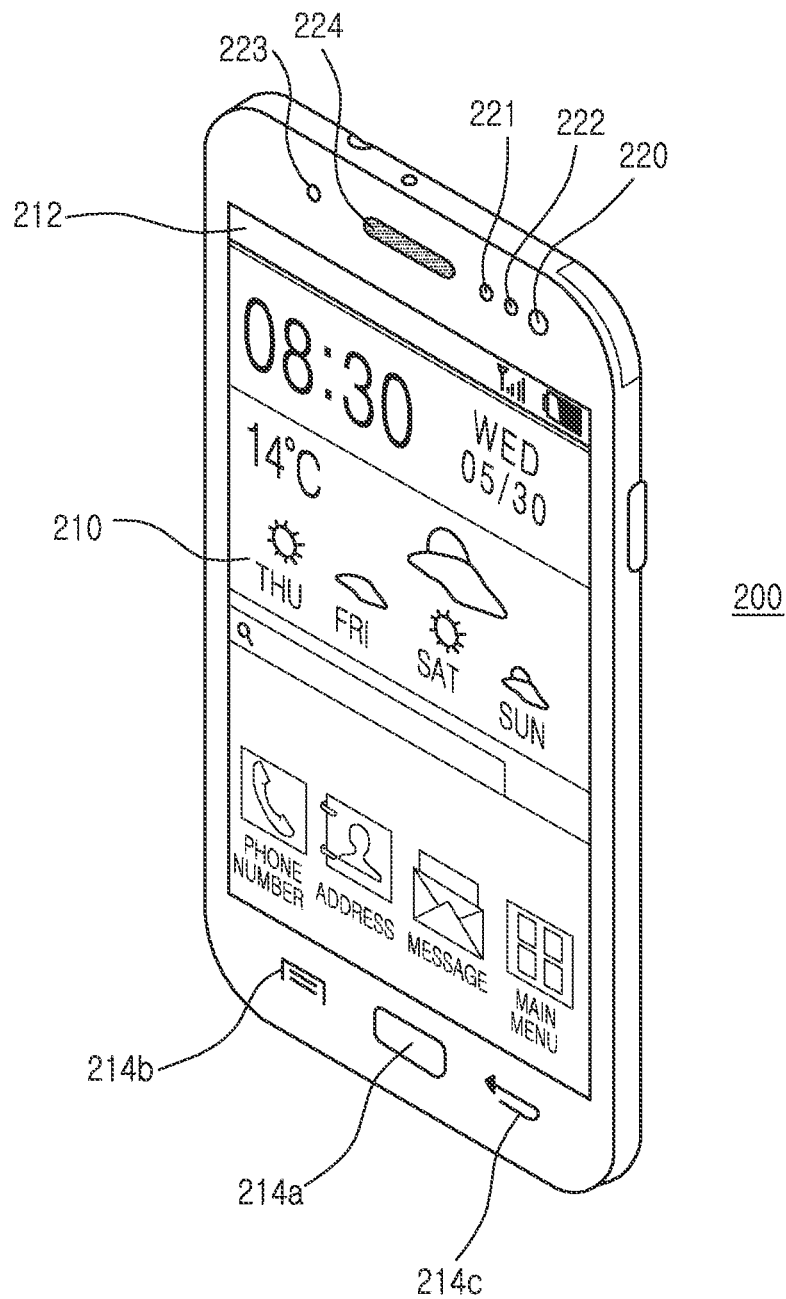
FIG. 2 is a perspective view illustrating a front surface of a portable electronic device according to an embodiment of the present disclosure.
Figure 3:
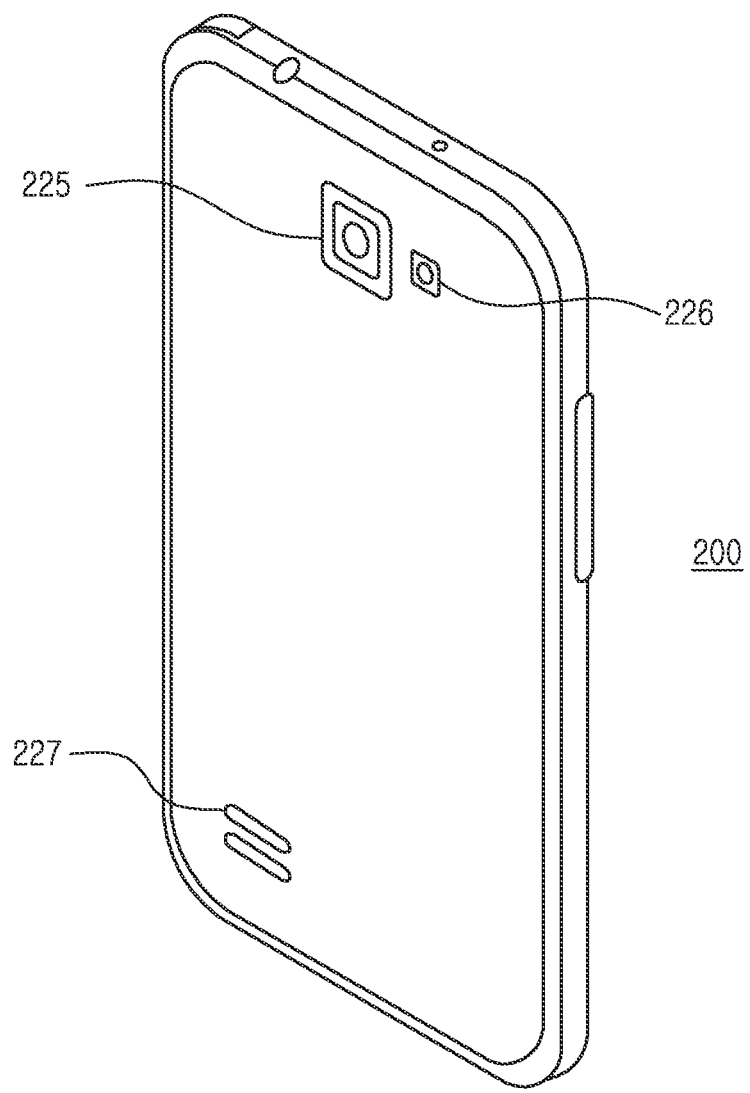
FIG. 3 is a perspective view illustrating a rear surface of a portable electronic device according to an embodiment of the present disclosure.

FIG. 2 is a perspective view illustrating a front surface of a portable electronic device according to an embodiment of the present disclosure. FIG. 3 is a perspective view illustrating a rear surface of a portable electronic device according to an embodiment of the present disclosure. Before descriptions of various embodiments of the present disclosure, an overall external appearance of a portable device, for example, a smartphone will be described.

The electronic device illustrated in FIGS. 2 and 3 is a portable electronic device, and has a size large enough to be gripped by a hand, but generally refers to a communication device of which a touchscreen (display) that has a diagonal size of 4 to 6 inches. However, various embodiments of the present disclosure may be applied to a mobile device of which a touchscreen is 6 inches or more in the same fashion. Hereinafter, various embodiments of the present disclosure will be described while taking a smartphone as an example of the electronic device.

Specifically, referring to FIGS. 2 and 3, a mobile device 200 is illustrated, where the mobile device 200 may include a touchscreen 210 that may be arranged on a front surface of the mobile device 200. The touch screen 210 may have a size large enough to occupy a great part of the front surface of the mobile device 200.

FIG. 2 illustrates an example in which a main home screen is displayed on the touchscreen 210. The main home screen may become the first screen displayed on the touch screen 210 when a power source of the mobile device 200 is switched on. When the mobile device 200 has different home screens of several pages, the main home screen may become the first home screen of the home screens of several pages. Shortcut icons for executing frequently used applications, a main menu key, time, and weather may be displayed on the home screen. The main menu key indicates a menu screen on the touchscreen 210.

A status bar 212 indicating statuses of the mobile device 200 such as a battery level, an intensity of a received signal, and the current time may be formed at an upper end of the touchscreen 210. A home button 214a, a menu button 214b, and a back button 214c may be arranged at a lower portion of the touchscreen 210 to be implemented in a touch manner or a physical press manner.

The home button 214a allows the main home screen to be displayed on the touchscreen 210. For example, when the home button 214a is touched while the home screen different from the main home screen or the menu screen is displayed on the touch screen 210, the main home screen may be displayed on the touchscreen 210. If the home button 214a is touched while applications are executed on the touch screen 210, the main home screen illustrated in FIG. 2 may be displayed on the touch screen 210. Furthermore, the home button 214a may also be used to allow recently used applications to be displayed on the touchscreen 210 or to allow a task manager to be displayed. The menu button 214b provides connection menus which may be used on the touchscreen 210. The connection menus may include a widget addition menu, a background changing menu, a search menu, an edition menu, and an environment setting menu. The back button 214c may allow a screen, which was executed shortly before the currently executed screen, to be displayed or terminate the most recently used application.

A first camera 220, an ambient light sensor 221, a proximity sensor 222, a motion sensor 223, and a receiver 224 may be arranged in an area of a front upper end of the mobile device 200. A second camera 225, a flash 226, a speaker 227 may be arranged on a rear surface of the mobile device 200, as illustrated in FIG. 3. For example, a power/reset button, a volume button, a terrestrial Digital Multimedia Broadcasting (DMB) antenna for receiving a broadcast, and one or a plurality of microphones may be arranged on a side surface of the mobile device 200.

Until now, a configuration of a portable mobile device such as a smartphone has been described. Hereinafter, a sensor module mounted to an area of a mobile device according to various embodiments of the present disclosure will be described with reference to the accompanying drawings based on the mobile device having the above-mentioned configuration. The area to which the sensor module is mounted is determined in consideration of a mounting space in the interior of the mobile device, and may be present around an upper end of a front surface of the mobile device.

An example of a plurality of sensors that may be mounted on the mobile device may include at least one of, for example, a gesture sensor, a gyro sensor, an atmospheric pressure sensor, a magnetic sensor, an acceleration sensor, a grip sensor, a proximity sensor, a color sensor (for example, an Red, Green, Blue (RGB) sensor), a living body sensor, a temperature/humidity sensor, an illumination intensity sensor, and an ultraviolet (UV) sensor.

The sensors may include, for example, an E-nose sensor, an electromyography (EMG) sensor, an electroencephalogram (EEG) sensor, an electrocardiogram (ECG) sensor, an Infrared (IR) sensor, an iris sensor, and a fingerprint sensor.

Figure 4A:
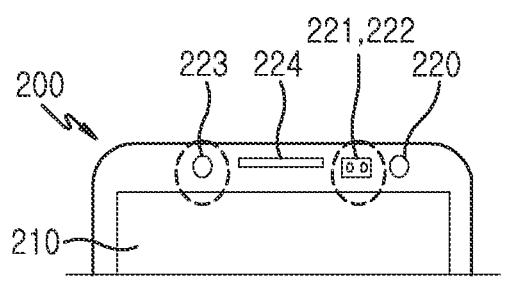
FIG. 4A is a view illustrating an arrangement of sensors mounted on a mobile device according to the related art.
Figure 4B:
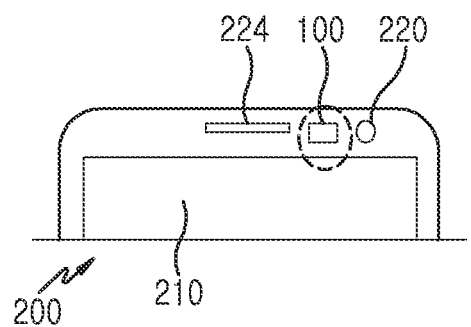
FIG. 4B is a view illustrating an arrangement of sensors mounted on a mobile device according to an embodiment of the present disclosure.

FIG. 4A is a view illustrating an arrangement of sensors mounted on a mobile device according to the related art, and FIG. 4B is a view illustrating an arrangement of sensors mounted on a mobile device according to an embodiment of the present disclosure.

Referring to FIG. 4A, a mobile device 200 is illustrated, where according to the related art, an Ambient Light Sensor (ALS)/Proximity Sensor (PS) 221, a gesture sensor 222, and a depth sensor 223 are separately mounted to an area of a front upper end of the touchscreen 210 of the mobile device 200 to be spaced apart from each other. The depth sensor 223 is arranged on the left side of a receiver 224 arranged at the center of the front upper end of the mobile device 200, and the ambient light sensor/proximity sensor 221 and the gesture sensor 222 are disposed on the right side of the receiver 224. However, because the sensors are constituted by mechanical modules and mounted on several substrates, a large space for mounting the sensors is necessary. Reference numeral 220 refers to a camera lens.

Referring to FIG. 4B, a mobile device 200 including a touchscreen 210 and a camera lens 220 is illustrated, where the mobile device 200 includes one sensor module 100 that is manufactured with three sensors and a digital block, such that a mechanical structure is commonly used in the sensor module 100, so that an area necessary for actually mounting components can be reduced. According to the related art, by mounting components to opposite sides (the left and right sides) of a receiver both sides of the receiver are occupied, whereas by mounting components on only one side (the right side), a space for mounting the component on the opposite side (the left side) can be unoccupied.

Figure 5:
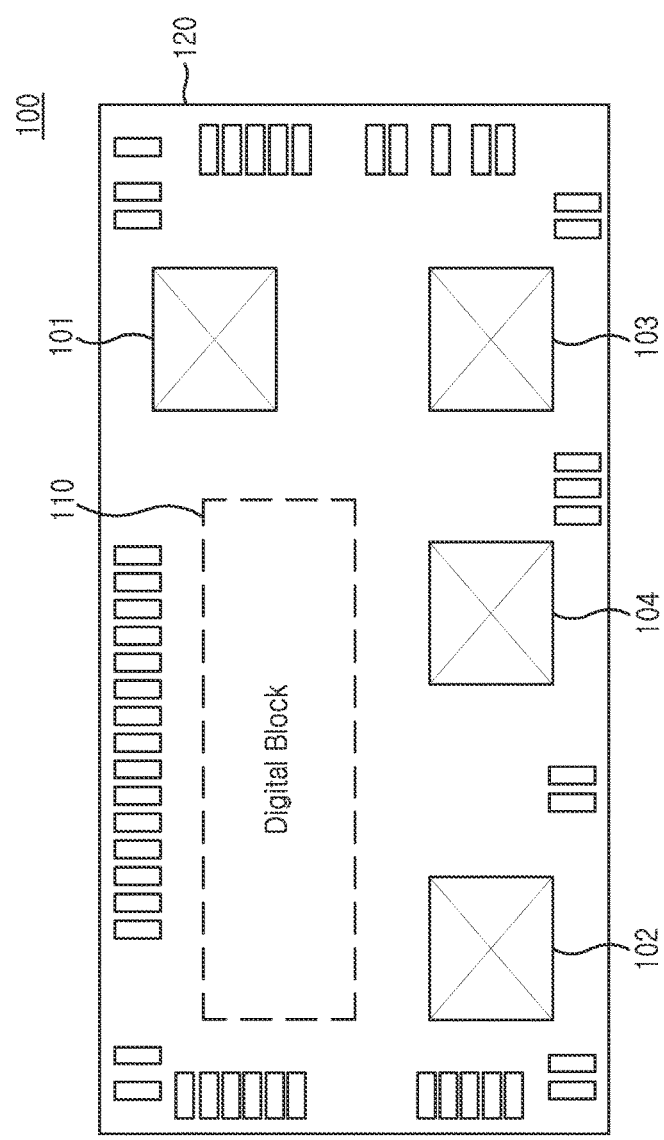
FIG. 5 is a view illustrating an arrangement of sensors according to an embodiment of the present disclosure.

FIG. 5 is a view illustrating an arrangement of sensors according to an embodiment of the present disclosure.

Referring to FIG. 5, a sensor module 100 of a mobile device is illustrated, where the sensor module 100 of the mobile device may include three or more sensors (first to fourth sensors). Although it is described in various embodiments of the present disclosure that four sensors 101 to 104 are arranged in one substrate 120, the sensors may not be limited to the four sensors but may be added or deleted according to a function of the mobile device. Because the four sensors 101 to 104 are mounted on one substrate 120 in the same semiconductor manufacturing process, a digital block 110 used for processing a sensor signal using the same CMOS process may be shared.

Hereinafter, an embodiment in which a gesture sensor, a depth sensor, and an ambient light/proximity sensor are disposed in an area of an upper end of a front surface of the mobile device will be described.

In the portable mobile device, a plurality of sensors may be disposed as illustrated in FIG. 4B, for an efficient arrangement of a mounting space. A predetermined distance may be maintained between two depth sensors 102 and 103, for measuring a depth. The plurality of sensors may be arranged along a periphery of the digital block 110 to be spaced apart from each other. The arrangement of the sensors may be an advantageous structure for processing signals between the digital block 110 and the sensors. That is, the digital block 110 and the sensors may be advantageously interconnected with each other.

In the portable mobile device, for an efficient arrangement of the mounting space, an IR sensor or a motion sensor (for example, a gesture sensor) may be located between the two sensors 102 and 103.

According to an embodiment of the present disclosure, a first sensor 101 may be a sensor for recognizing a gesture. The first sensor 101 may be an image sensor, and may analyze an image input to the first sensor and may recognize a movement direction of the user. The image input to the sensor may include the face of the user, and in this case, the face of the user may be recognized using a Face Detection (FD) function. When the first sensor is a gesture sensor, the fourth sensor may be an ambient light/proximity sensor.

An independent lens module (see FIG. 5) different from the other sensors may be mounted on the first sensor 101, and the lens may have a wide lens structure of 80 degrees or more that is designed to receive a larger amount of surrounding information.

A second sensor 102 and a third sensor 103 arranged in remote sites may be sensors for recognizing depth information. Depth information of a subject may be determined using a phase difference of pieces of information input to the two sensors 102 and 103.

The second sensor 102 and the third sensor 103 may read gesture information input to the sensors. A fourth sensor 104 may be a sensor for recognizing ambient light and proximity. The fourth sensor 104 may include an IR light emitting unit and a light receiving unit, for detection of proximity. The fourth sensor 104 may not have a lens thereon.

Figure 6:
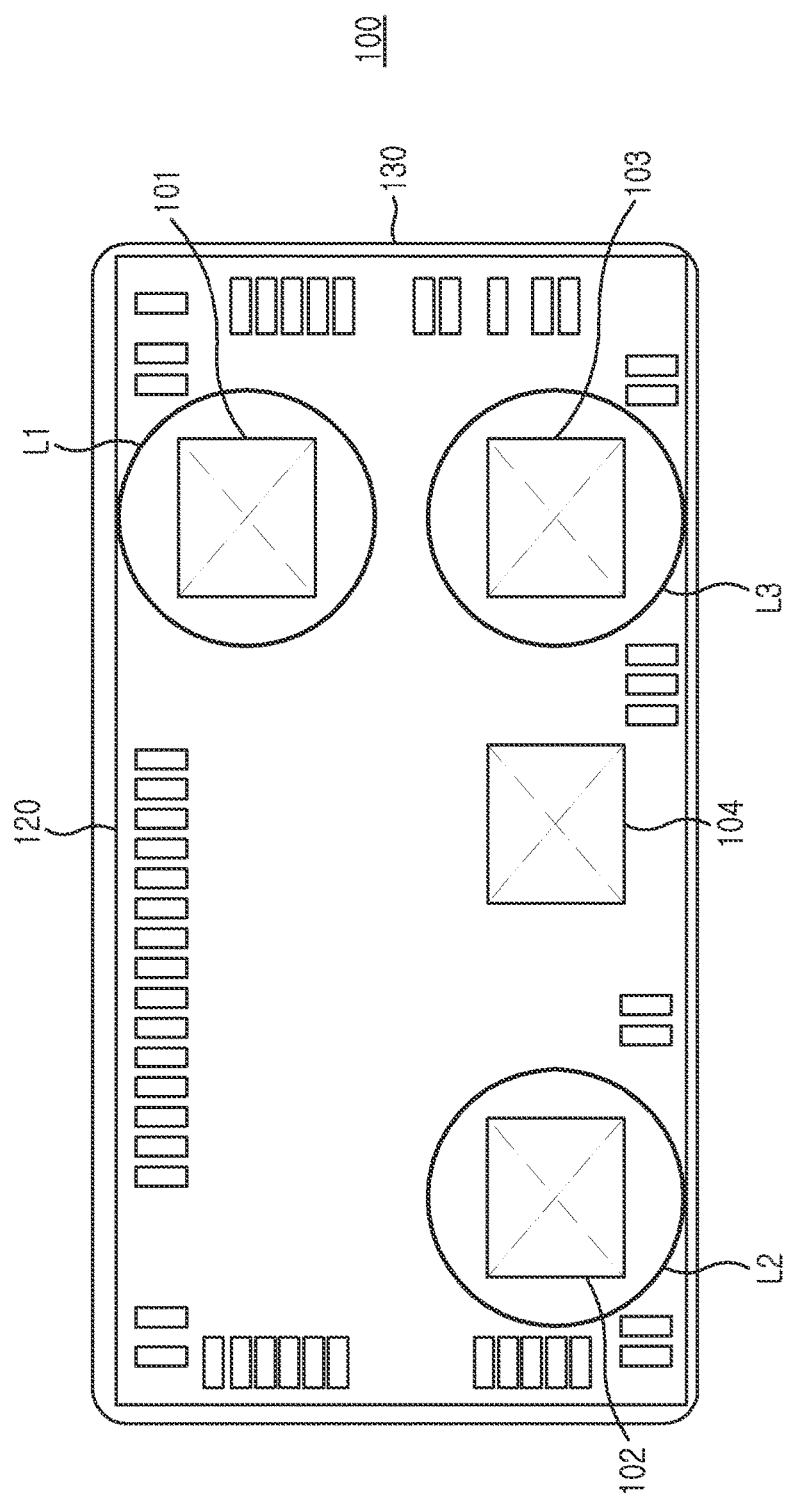
FIG. 6 is a view illustrating an embodiment in which optical elements, each having one or a plurality of lenses that are mounted on sensors, are arranged in a sensor module, according to an embodiment of the present disclosure.
Figure 7:
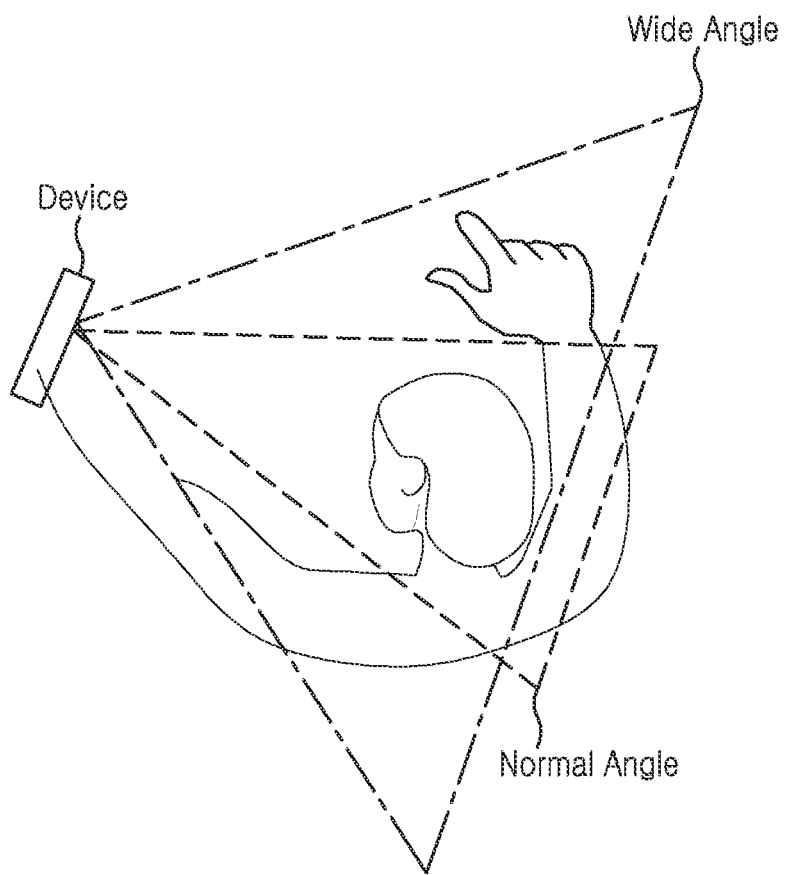
FIG. 7 is a view illustrating a difference between data inputs of a wide lens and a normal lens according to an embodiment of the present disclosure.

FIG. 6 is a view illustrating an embodiment in which optical elements (130), each having one or a plurality of lenses that are mounted on sensors, are arranged in a sensor module, according to an embodiment of the present disclosure. FIG. 7 is a view illustrating a difference between data inputs of a wide lens and a normal lens according to an embodiment of the present disclosure.

Referring to FIGS. 6 and 7, a sensor module 100 is illustrated, where the sensor module 100 includes a substrate 120, a first sensor 101, such that when the first sensor 101 of the sensor module 100 is a gesture sensor, a lens L1 located on the gesture sensor 101 may be designed as a wide angle lens having an obtuse angle of 90 degrees or more that is larger than those of other lenses, such that the sensor may receive a large amount of operation data. The lens designed as a normal lens having a normal angle (90 degrees or less) may not easily recognize a motion of an arm of the user between the user and the terminal. Reference number 130 denote optical element having one or a plurality of lenses.

When second and third sensors 102 and 103 are depth sensors, lenses L2 and L3 mounted on the depth sensors may be designed as lenses having a general angle of view or an astute angle that corresponds to the general angle of view or less. Then, because it is efficient to space the depth sensors 102 and 103 by a predetermined distance or more, the lenses L2 and L3 mounted on the upper ends of the depth sensors 102 and 103 may not have a wide angle.

When a fourth sensor 104 is an IR sensor, the lens mounted on the IR sensor may be a planar lens, and a lens may not be mounted on the IR sensor for accuracy of an IR light emitter and an RI light receiver.

TABLE 1

|       | ALS        | PS         | GMD     | FD      | Depth      |
|-------|------------|------------|---------|---------|------------|
| ALS   | —          | 4          | 1, 4    | 1, 4    | 1, 2, 3, 4 |
| PS    | 4          | —          | 1, 4    | 1, 4    | 1, 2, 3, 4 |
| GMD   | 1, 4       | 1, 4       | —       | 1       | 1, 2, 3    |
| FD    | 1, 4       | 1, 4       | 1       | —       | 1, 2, 3    |
| Depth | 1, 2, 3, 4 | 1, 2, 3, 4 | 1, 2, 3 | 1, 2, 3 | —          |

Table 1 represents the driving of sensors when various functions are driven at the same time according to various embodiments of the present disclosure. In Table 1, the numbers denote the driven sensors. The driven first sensor may be denoted by 1, the driven second sensor may be denoted by 2, the driven third sensor may be denoted by 3, and the driven fourth sensor may be denoted by 4.

According to Table 1, when the functions of the ALS and the PS are driven together, only the fourth sensor may be used for driving.

When the ALS function is driven together with a Global Motion Detection (GMD) function or a Face Detection function (FD), only the first sensor for the GMD function and the fourth sensor for the ALS function may be driven for the functions.

When the ALS function, the FD function, and the depth recognition function are driven together, all the first to fourth sensors may operate to perform the corresponding functions.

In Table 1, the sensor for recognizing ambient light or proximity may be the fourth sensor, the sensor for recognizing an operation, or a face may be the first sensor, and the sensors for recognizing depth may be the second and third sensors, so that the corresponding functions may be performed.

Figure 8:
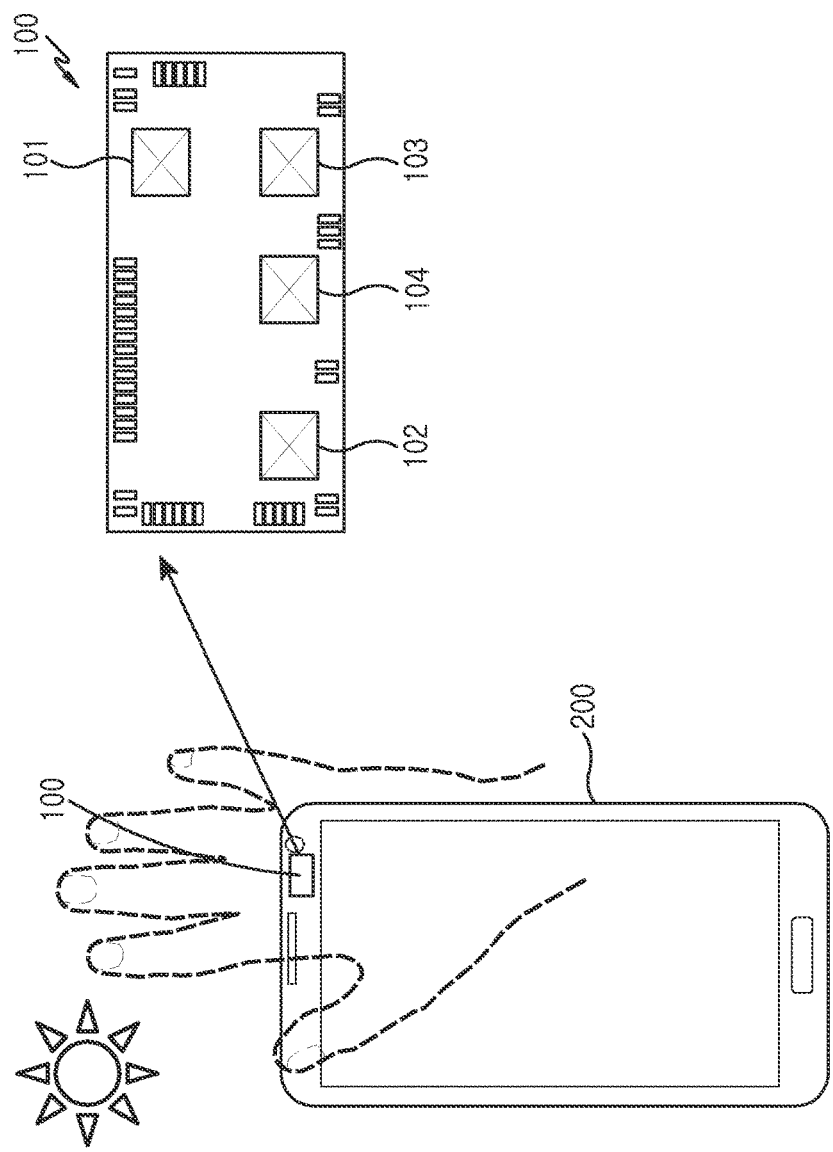
FIGS. 8, 9, 10, 11, and 12 are views illustrating examples of driving a sensor module according to various embodiments of the present disclosure.

FIG. 8 is a view illustrating an example of a driving sensor module according to an embodiment of the present disclosure.

Referring to FIG. 8, a mobile device 200 and a sensor module 100 are illustrated, such that when an ambient light sensor and a proximity sensor are driven together and when other sensors are not driven, only a fourth sensor 104 may be used to perform the corresponding function. Then, the remaining sensors 101, 102, and 103 are converted into a sleep state and, accordingly, standby power can be reduced.

Figure 9:
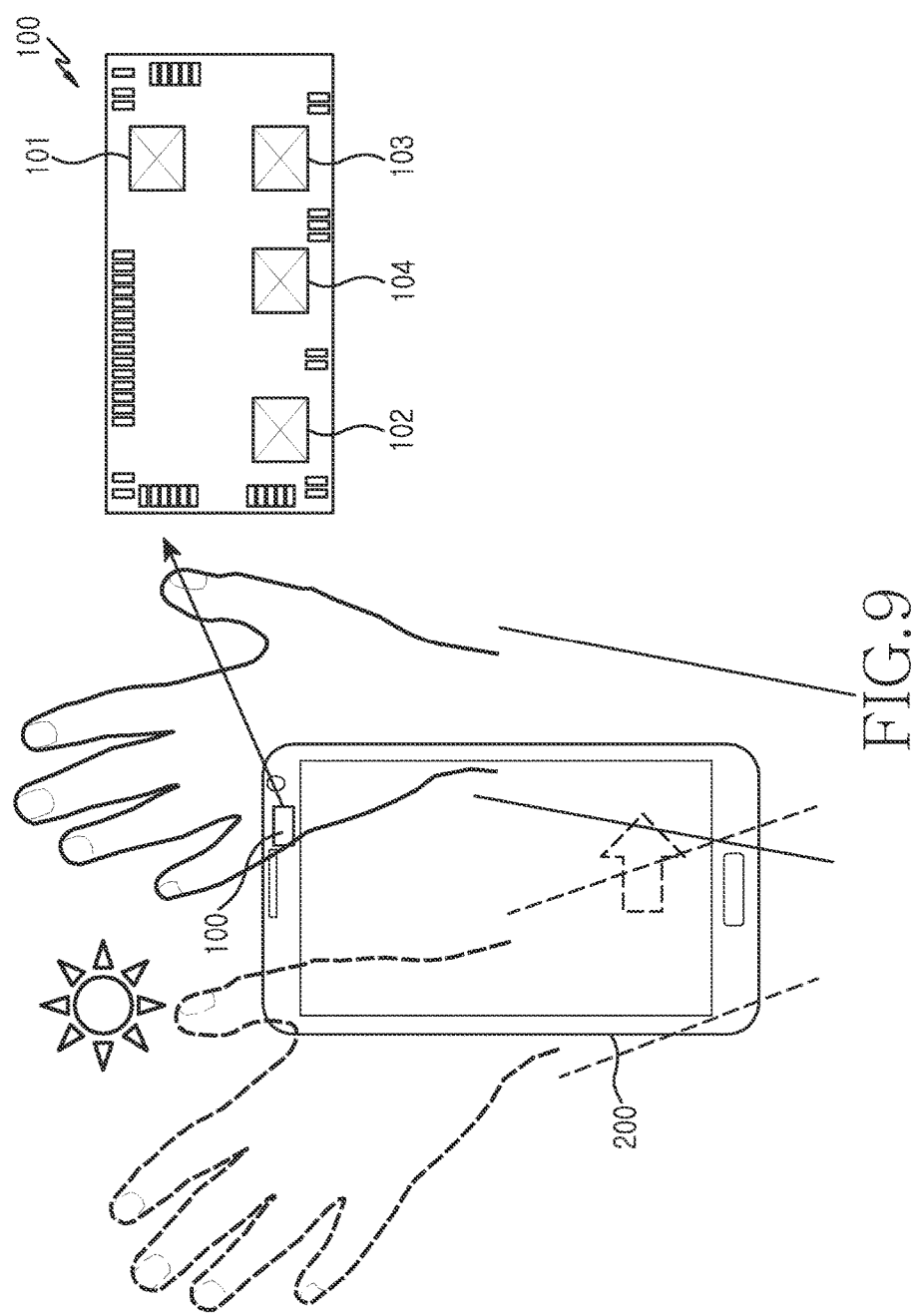

FIG. 9 is a view illustrating an example of a driving sensor module according to an embodiment of the present disclosure.

Referring to FIG. 9, a mobile device 200 and a sensor module 100 are illustrated, such that when an ambient sensor is driven and a gesture sensor for detecting an operation of a front side of the mobile device 200 is driven, only a first sensor 101 and a fourth sensor 104 may be switched on to perform the corresponding functions. Then, remaining sensors 102 and 103 may be converted into a sleep state, and accordingly, standby power can be reduced.

Figure 10:
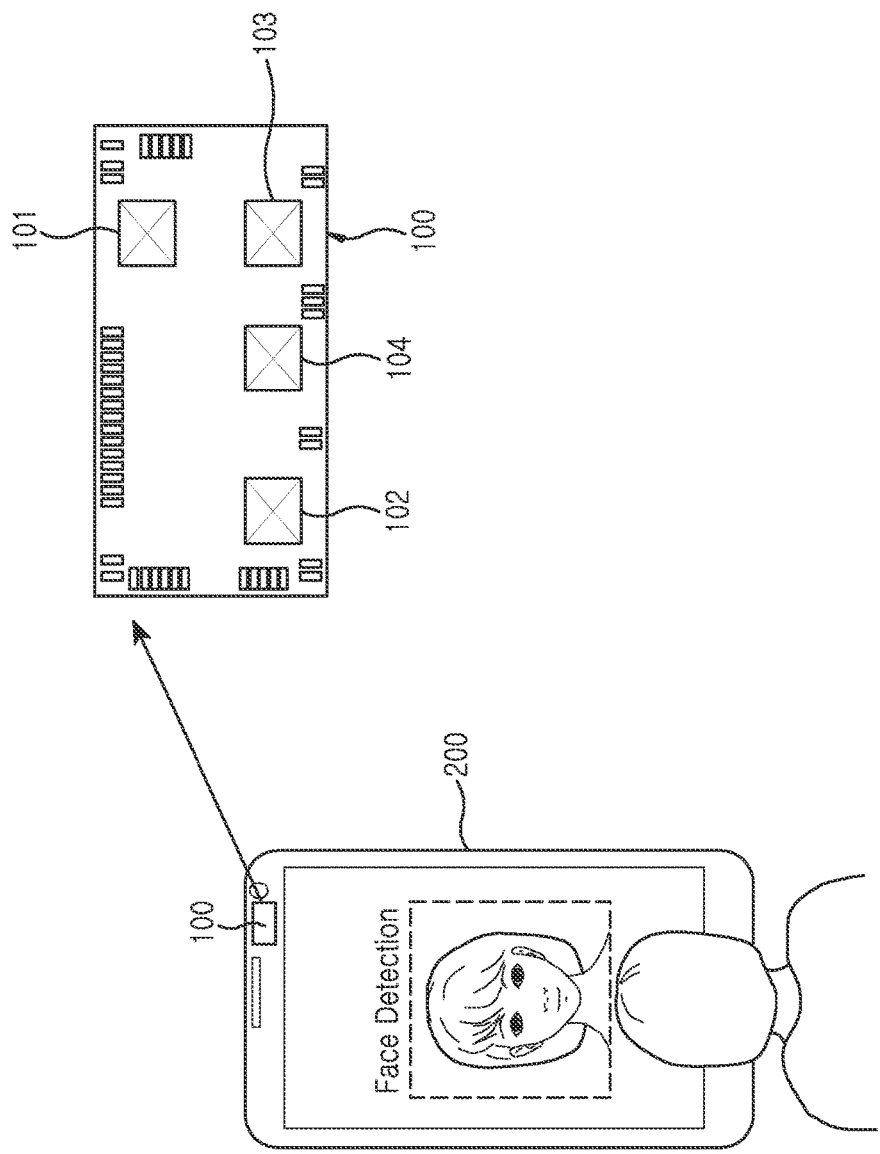

FIG. 10 is a view illustrating an example of a driving sensor module according to an embodiment of the present disclosure.

Referring to FIG. 10, a mobile device 200 and a sensor module 100 are illustrated, such that when only a function for recognizing a face is performed, only a first sensor 101 designed to recognize a face may be driven to perform the corresponding function. Then, remaining sensors 102, 103, and 104 may be converted into a sleep state, and accordingly, standby power can be reduced.

Figure 11:
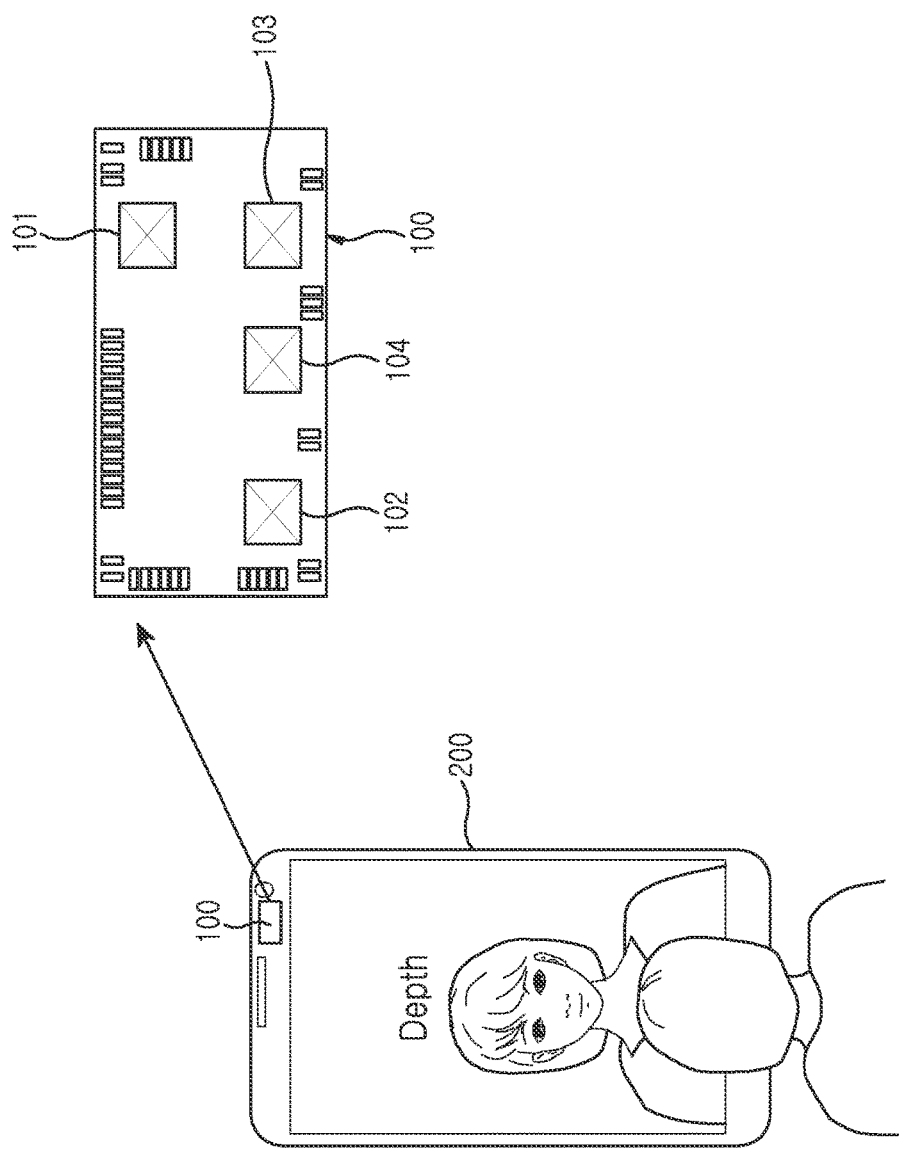

FIG. 11 is a view illustrating an example of a driving sensor module according to an embodiment of the present disclosure.

Referring to FIG. 11, a mobile device 200 and a sensor module 100 are illustrated, such that when a specific function is performed using a gesture of the user and depth information, a corresponding function may be performed only using a first sensor 101 and second and third sensors 102 and 103 for outputting depth information. Then, a remaining sensor 104 may be converted into a sleep state, and accordingly, standby power can be reduced.

Figure 12:
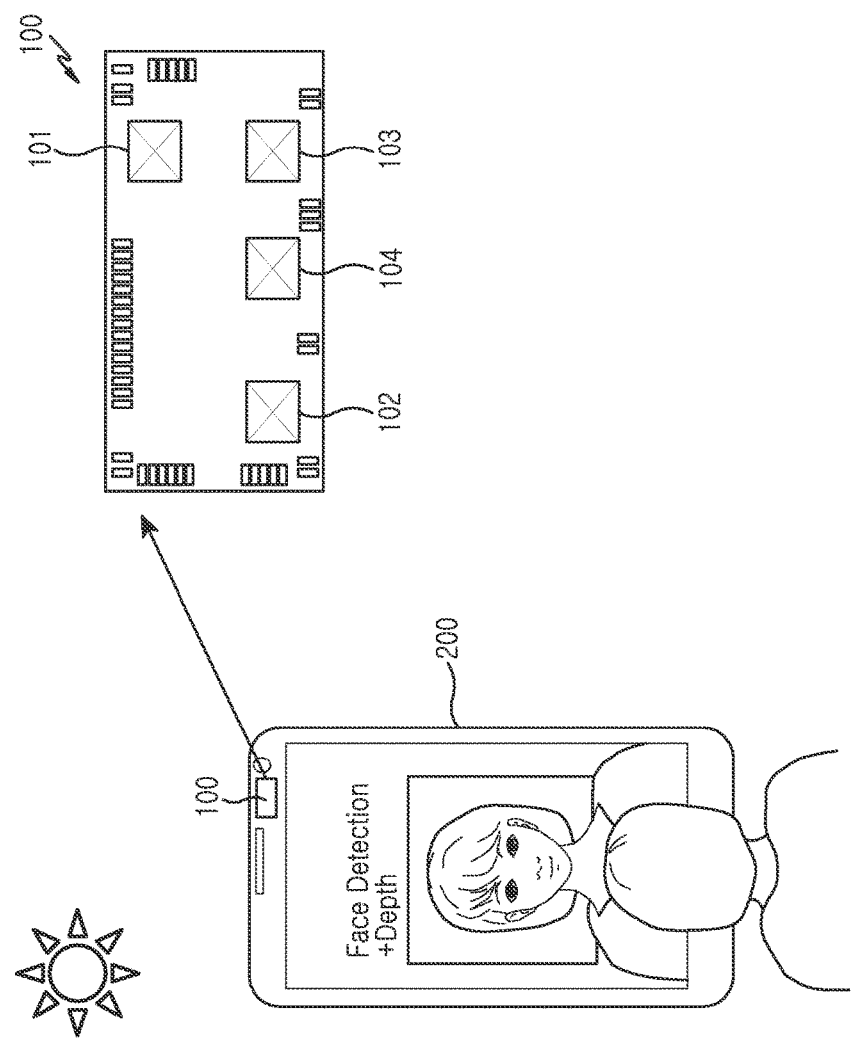

FIG. 12 is a view illustrating an example of a driving sensor module according to an embodiment of the present disclosure.

Referring to FIG. 12, a mobile device 200 and a sensor module 100 are illustrated, such that when an ambient sensor performs a specific function using gesture, face detection, and depth information, all four sensors including a first sensor 101 for recognizing a face of a user, second and third sensors 102 and 103 for outputting depth information, and a fourth sensor 104 for recognizing ambient light may be used to perform corresponding functions.

Figure 13:
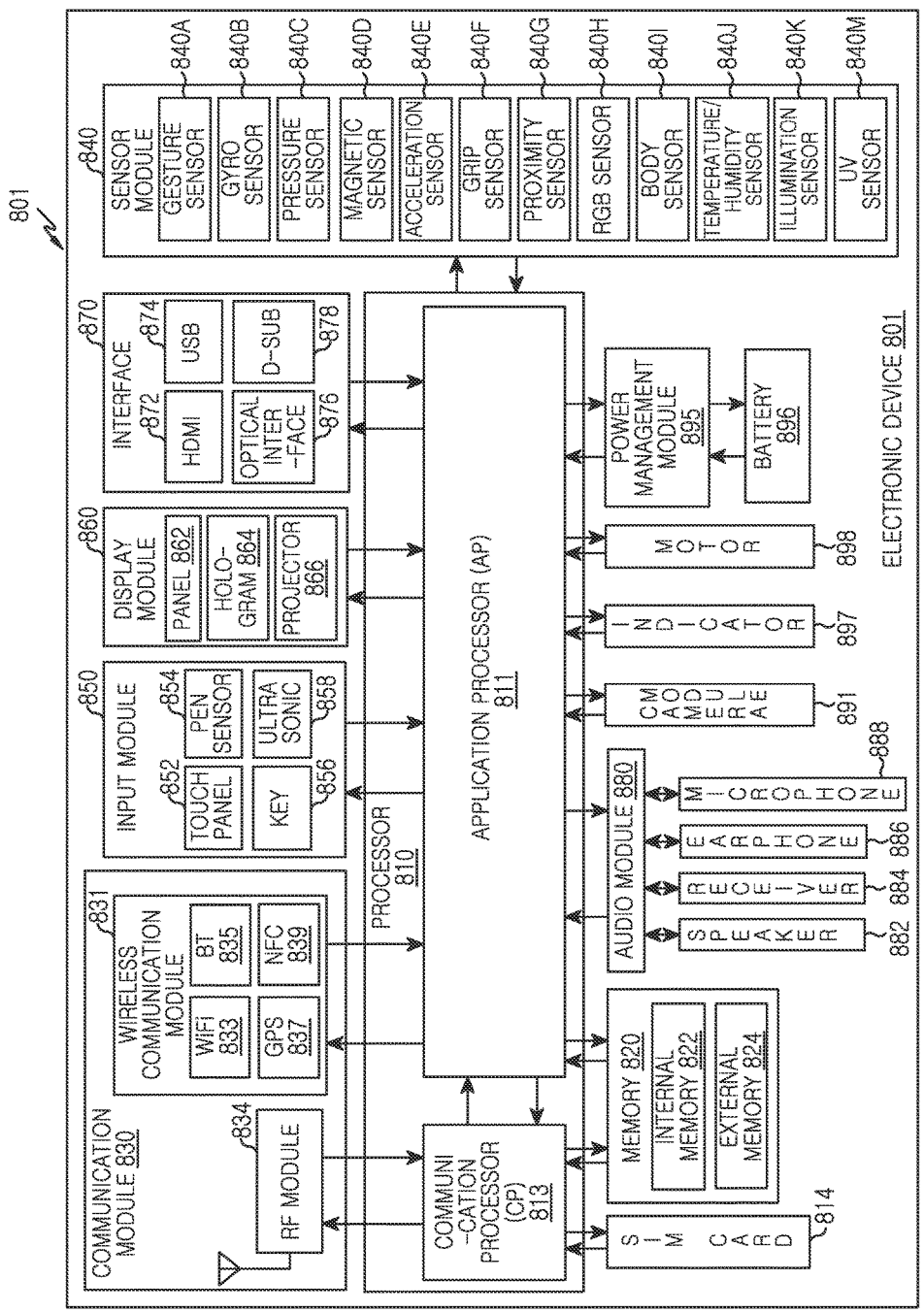
FIG. 13 is a block diagram illustrating an electronic device according to an embodiment of the present disclosure.

FIG. 13 is a block diagram illustrating an electronic device according to an embodiment of the present disclosure.

Referring to FIG. 13, an electronic device 801 is illustrated, where the electronic device 801 may include one or more processors 810, a Subscriber Identity Module (SIM) card 814, a memory 820, a communication module 830, a sensor module 840, an input module 850, a display module 860, an interface 870, an audio module 880, a camera module 891, a power management module 895, a battery 896, an indicator 897, and a motor 898. For example, the electronic device 801 may constitute all or a part of the electronic device 101, as illustrated in FIG. 1.

The processor 810 (for example, the processor 120, as illustrated in FIG. 1) may include at least one Application Processor (AP) 811 and/or at least one Communication Processor (CP) 813. Although the AP 811 and the CP 813 are included in the processor 810 in FIG. 13, the AP 811 and the CP 813 may be included in different IC packages. According to an embodiment of the present disclosure, the AP 811 and the CP 813 may be included in one IC package.

The AP 811 may control a plurality of hardware or software elements connected thereto by driving an operating system or an application program, process various types of data including multimedia data, and perform calculations. The AP 811 may be implemented by, for example, a System on Chip (SoC). According to an embodiment of the present disclosure, the processor 810 may further include a Graphics Processing Unit (GPU) (not illustrated).

The CP 813 may perform a function of managing data-links and converting communication protocols in communications between the electronic device 801 (for example, the electronic device 101) and other electronic devices (for example, the electronic device 102, the electronic device 104, and/or the server 106, as illustrated in FIG. 1) connected through a network. The CP 813 may be implemented, for example, by an SoC. According to an embodiment of the present disclosure, the CP 813 may perform at least some of multimedia control functions. The CP 813 may distinguish and authenticate an electronic device in a communication network using a subscriber identification module (for example, the SIM card 814). In addition, the CP 813 may provide the user with services such as voice calls, video calls, text messages, or packet data.

The CP 813 may control transmission and reception of data of the communication module 830. Although the elements such as the CP 813, the power management module 895, and/or the memory 820 are illustrated as separate elements from the AP 811 in FIG. 13, the AP 811 may include at least a part (for example, the CP 813) of the above-mentioned elements according to the embodiment of the present disclosure.

According to an embodiment of the present disclosure, the AP 811 or the CP 813 may load commands or data received from at least one of a non-volatile memory or other elements which are connected with the AP 811 or the CP 813 in a volatile memory, and process the same. In addition, the AP 811 or the CP 813 may store data that are received from or generated by at least one of the elements in a non-volatile memory.

The SIM card 814 may be a card including a subscriber identification module and may be inserted into a slot formed in a predetermined portion of the electronic device. The SIM card 814 may include unique identification information (for example, an Integrated Circuit Card IDentifier (ICCID)) or subscriber information (for example, an International Mobile Subscriber IDentity (IMSI)).

The memory 820 (for example, the memory 130, as illustrated in FIG. 1) may include an internal memory 822 and/or an external memory 824. The internal memory 822 may include at least one of a volatile memory (for example, a Dynamic Random Access Memory (DRAM), a Static RAM (SRAM), and a Synchronous Dynamic RAM (SDRAM)) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a Not And (NAND) flash memory, and a Not Or (NOR) flash memory).

According to one embodiment of the present disclosure, the internal memory 822 may be a Solid State Drive (SSD). The external memory 824 may further include a flash drive, for example, a Compact Flash (CF), a Secure Digital (SD), a Micro SD (Micro-SD), a Mini SD (Mini-SD), and/or an extreme Digital (xD), a memory stick. The external memory 824 may be functionally connected to the electronic device 801 through various interfaces. According to one embodiment of the present disclosure, the electronic device 801 may further include a storage device (or a storage medium) such as a hard drive.

The communication module 830 (for example, the communication interface 160, as illustrated in FIG. 1) may include a wireless communication module 831 and/or an RF module 834. The wireless communication module 831 may include, for example, WiFi 833, BT 835, a GPS 837, and/or a NFC 839. For example, the wireless communication module 831 may provide a wireless communication function using wireless frequencies. Additionally or alternatively, the wireless communication module 831 may include a network interface (for example, a LAN card), or a modem for connecting the electronic device 801 to a network (for example, the Internet, a LAN, a WAN, a telecommunication network, a cellular network, a satellite network, a POTS, etc.).

The RF module 834 may transmit/receive data, for example, an RF signal. Although not illustrated, the RF module 834 may include, for example, a transceiver, a Power Amp Module (PAM), a frequency filter, or a Low Noise Amplifier (LNA). Further, the RF unit 834 may further include a component for transmitting/receiving an electromagnetic wave in the air in radio communication, such as a conductor or a conducting wire.

The sensor module 840 may measure a physical quantity or detect an operating state of the electronic device 801 and convert the measured or detected information into an electronic signal. The sensor module 840 may include, for example, at least one of a gesture sensor 840A, a gyro sensor 840B, an atmospheric pressure sensor 840C, a magnetic sensor 840D, an acceleration sensor 840E, a grip sensor 840F, a proximity sensor 840G, a color sensor 840H (for example, red, green, and blue (RGB) sensor), a biometric (body) sensor 840I, a temperature/humidity sensor 840J, an illumination sensor 840K, and a UV sensor 840M.

Additionally or alternatively, the sensor module 840 may include, for example, an E-nose sensor (not illustrated), an EMG sensor (not illustrated), an EEG sensor (not illustrated), an ECG sensor (not illustrated), an IR sensor (not illustrated), an iris scanner (not illustrated), and/or a fingerprint sensor (not illustrated). The sensor module 840 may further include a control circuit for controlling at least one sensor included therein.

The input module 850 may include a touch panel 852, a (digital) pen sensor 854, a key 856, or an ultrasonic input device 858. The touch panel 852 may recognize a touch input through at least one of, for example, a capacitive type, a resistive type, an infrared type, and an ultrasonic type. The touch panel 852 may further include a control circuit. In case of the capacitive type touch panel, physical contact or proximity recognition is possible. The touch panel 852 may further include a tactile layer. In this case, the touch panel 852 may provide a tactile reaction to a user.

The (digital) pen sensor 854 may be implemented, for example, using the same or similar method to receiving a user's touch input or using a separate recognition sheet. The key 856 may include, for example, a physical button, an optical key, or a keypad. The ultrasonic input unit 858 is a unit that can identify data by generating an ultrasonic signal through an input tool and detecting a sonic wave through a microphone (for example, a microphone 888) in the electronic device 801, and may implement wireless recognition. According to an embodiment of the present disclosure, the electronic device 801 may receive a user input from an external device (for example, a network, a computer, or a server), which is connected to the electronic device 801, through the communication module 830.

The display module 860 (for example, the display unit 150, as illustrated in FIG. 1) may include a panel 862, a hologram device 864, and/or a projector 866. The panel 862 may be, for example, a Liquid Crystal Display (LCD), or an Active-Matrix Organic Light Emitting Diode (AM-OLED). The panel 862 may be implemented to be, for example, flexible, transparent, or wearable. The panel 862 also may be configured as one module together with the touch panel 852. The hologram 864 may display 3D images in the air by using interference of light. The projector 866 may project light onto a screen to display an image.

For example, the screen may be located inside or outside the electronic device 801. According to an embodiment of the present disclosure, the display module 860 may further include a control circuit for controlling the panel 862, the hologram 864, and/or the projector 866.

The interface 870 may include, for example, a HDMI 872, a USB 874, an optical interface 876, and/or a D-subminiature (D-sub) 878. The interface 870 may be included in, for example, the communication interface 160, as illustrated in FIG. 1. Additionally or alternatively, the interface 870 may include, for example, a Mobile High-definition Link (MHL) interface (not illustrated), a Secure Digital (SD) card/Multi-Media Card (MMC) interface (not illustrated), or an Infrared Data Association (IrDA) standard interface (not illustrated).

The audio module 880 may bi-directionally convert a sound and an electronic signal. At least some elements of the audio module 880 may be included in, for example, the input/output interface 140, as illustrated in FIG. 1. The audio module 880 may process voice information input or output through, for example, a speaker 882, a receiver 884, earphones 886, and/or the microphone 888.

The camera module 891 is a device which can photograph an image and a dynamic image. According to an embodiment, the camera module 891 may include one or more image sensors (for example, a front lens or a back lens), a lens (not illustrated), an Image Signal Processor (ISP) (not illustrated) or a flash (not illustrated) (for example, LED or xenon lamp).

The power management module 895 may manage electric power of the electronic device 801. Although not illustrated, the power management module 895 may include, for example, a Power Management Integrated Circuit (PMIC), a charger IC, a battery or fuel gauge.

The PMIC may be mounted to, for example, an integrated circuit or an SoC semiconductor. Charging methods may be classified into a wired charging method and a wireless charging method. The charger IC may charge a battery and prevent over voltage or over current from a charger. According to one embodiment, the charger IC may include a charger IC for at least one of the wired charging method and the wireless charging method. Examples of the wireless charging method may include a magnetic resonance type, a magnetic induction type, or an electromagnetic wave type, and an additional circuit for wireless charging, such as a coil loop circuit, a resonance circuit, or a rectifier circuit may be added.

The battery gauge may measure, for example, the remaining amount of battery, a charging voltage and current, or temperature. The battery 896 may store or generate electricity and supply power to the electronic device 800 using the stored or generated electricity. The battery 896 may include, for example, a rechargeable battery or a solar battery.

The indicator 897 may show particular statuses of the electronic device 801 and/or a part (for example, AP 811) of the electronic device 801, for example, a booting status, a message status, a charging status and the like. The motor 898 may convert an electrical signal into mechanical vibration. Although not illustrated, the electronic device 801 may include a processing unit (for example, a GPU) for supporting mobile TV. The processing unit for supporting mobile TV may process media data according to a standard of DMB, Digital Video Broadcasting (DVB), media flow or the like.

Each of the components of the electronic device according to the present disclosure may be implemented by one or more components and the name of the corresponding component may vary depending on the type of the electronic device. The electronic device according to the present disclosure may be configured by including at least one of the above-described elements, and some of the elements may be omitted, or other elements may be added. Further, some of the elements of the electronic device according to the present disclosure may be combined to be one entity, which can perform the same functions as those of the components before the combination.

According to various embodiments, at least some of the devices (for example, modules or functions thereof) or the method (for example, operations) according to the present disclosure may be implemented by a command stored in a non-transitory computer-readable storage medium in a programming module form. When the command is executed by one or more processors, the one or more processors may perform a function corresponding to the command. The computer-readable storage medium may be, for example, the memory. At least some of the programming modules may be implemented (for example, executed) by, for example, the processor. At least some of the programming modules may include, for example, a module, a program, a routine, a set of instructions or a process for performing one or more functions.

The computer-readable recording medium may include magnetic media such as a hard disk, a floppy disk, and a magnetic tape, optical media such as a Compact Disc Read Only Memory (CD-ROM) and a DVD, magneto-optical media such as a floptical disk, and hardware devices specially configured to store and perform a program instruction (for example, programming module), such as a ROM, a RAM, a flash memory and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The module or programming module according to an embodiment of the present disclosure may include one or more of the above-described elements. Alternatively, some of the above-described elements may be omitted from the programming module. Alternatively, the programming module may further include additional elements. Operations executed by a module, a programming module, or other component elements according to the present disclosure may be executed sequentially, in parallel, repeatedly, or in a heuristic manner. Further, some operations may be executed according to another order or may be omitted, or other operations may be added.

While the present disclosure has been shown and described with reference to various embodiments thereof, it will be understood by those skilled in the art that various changes in forms and details may be made therein without departing from the spirit and scope of the present disclosure as defined by the appended claims and their equivalents.

What is claimed is:
1. A sensor module comprising:
   three or more sensors; and
   a substrate having the three or more sensors arranged thereon,
   wherein the substrate, on which the three or more sensors are arranged, is disposed on one side of a central area of an upper end of a mobile device.
2. The sensor module of claim 1, wherein the three or more sensors are arranged along a periphery of a digital block mounted to the substrate to interwork with the digital block.

3. The sensor module of claim 2, wherein the three or more sensors are mounted on a front surface of the mobile device.

4. The sensor module of claim 2,
wherein the three or more sensors comprise a gesture sensor, a depth sensor, and an ambient light/a proximity sensor, and
wherein the depth sensor comprises two sensors that are spaced apart from each other and the ambient light/proximity sensor shares one sensor.

5. The sensor module of claim 4, wherein one or a plurality of sensors of the three or more sensors further comprise an optical element.

6. The sensor module of claim 5, wherein the optical element comprises a lens.

7. The sensor module of claim 6,
wherein the lens comprises one of a normal lens and a wide-angle lens, and
wherein the lens is mounted to one of the gesture sensor and the depth sensor.

8. The sensor module of claim 1,
wherein the three or more sensors include a first sensor, a second sensor, a third sensor, a fourth sensor, and a fifth sensor,
wherein the first sensor comprises an ambient light sensor (ALS),
wherein the second sensor comprises a proximity sensor (PS) sensor,
wherein the third sensor comprises a Global Motion Detection (GMD) sensor,
wherein the fourth sensor comprises a face detection (FD) sensor, and
wherein the fifth sensor comprises a depth sensor.

9. A mobile device comprising:
a front surface area including a substrate; and
three or more sensors arranged on the substrate,
wherein each of the three or more sensors is spaced apart from one another,
wherein the three or more sensors are mounted to the front surface area, and
wherein the substrate, on which the three or more sensors are arranged, is disposed on one side of a central area of an upper end of the mobile device.

10. The mobile device of claim 9, wherein the substrate, on which the three or more sensors are arranged, is disposed on one side of a receiver disposed at a central portion of an upper end of the front surface area.

11. The mobile device of claim 9, wherein the three or more sensors share a digital block provided on the substrate.

12. The mobile device of claim 11, wherein the three or more sensors are arranged along a periphery of the digital block and interlock with the digital block.

13. The mobile device of claim 12, wherein the three or more sensors comprise a gesture sensor, a depth sensor, and an ambient light/proximity sensor.

14. A method of driving sensors of a sensor module manufactured by arranging first to fourth sensors on a substrate, the method comprising:
recognizing, by the sensor module, a face/gesture of a user; and
driving, by the sensor module, only the first sensor of the first to fourth sensors, when the face/gesture of the user is recognized, such that the second sensor, the third sensor and the fourth sensor are in a sleep mode.

15. The method of claim 14, wherein, when an ambient light/proximity of the user is recognized, the fourth sensor is driven and the remaining first to third sensors are in a sleep mode.

16. The method of claim 15, wherein, when a depth is measured, the second and third sensors are driven and the remaining first and fourth sensors are in a sleep mode.

17. The method of claim 14,
wherein, when the face/gesture of the user is recognized and an ambient light/proximity is recognized, the first and fourth sensors are driven and the second and third sensors are in a sleep mode,
wherein, when the face/gesture of the user is recognized and a depth is measured, the first to third sensors are driven and the fourth sensor is in a sleep mode,
wherein, when the ambient light/proximity is recognized and the depth is measured, the second to fourth sensors are driven and the first sensor is in a sleep mode, and
wherein, when the face/gesture of the user is recognized, when the depth is measured, and when the ambient light/proximity is recognized, the first to fourth sensors are driven.

* * * * *